United States Patent [19]
Pearson

[11] 4,072,019
[45] Feb. 7, 1978

[54] SOIL CONSOLIDATION METHOD

[75] Inventor: Leonard Louis Pearson, Slough, England

[73] Assignee: Fosroc International Limited, London, England

[21] Appl. No.: 585,624

[22] Filed: June 10, 1975

Related U.S. Application Data

[63] Continuation-in-part of Ser. No. 415,472, Nov. 13, 1973, abandoned.

[51] Int. Cl.² ............................................. E02D 3/14
[52] U.S. Cl. ................................ 61/36 C; 106/74; 106/287 SS
[58] Field of Search .............. 61/36 C; 252/316, 317; 106/74, 287 SS; 260/DIG. 14; 406/75; 166/292, 293

[56] References Cited

U.S. PATENT DOCUMENTS

| | | | |
|---|---|---|---|
| 3,493,406 | 2/1970 | Fillet et al. | 106/74 |
| 3,558,506 | 1/1971 | Bonnel et al. | 106/74 |
| 3,642,503 | 2/1972 | Braney | 106/74 |
| 3,865,600 | 2/1975 | Pearson et al. | 106/287 SS |
| 3,876,439 | 4/1975 | Schneider | 106/287 SS |

FOREIGN PATENT DOCUMENTS

| | | | |
|---|---|---|---|
| 675,511 | 1/1966 | Belgium | 61/36 C |

*Primary Examiner*—Paul R. Gilliam
*Assistant Examiner*—A. Grosz
*Attorney, Agent, or Firm*—Caesar, Rivise, Bernstein & Cohen

[57] ABSTRACT

A soil consolidation composition and method of use involving an aqueous composition of an alkali metal silicate and a gelling agent, the composition having a viscosity sufficiently low (about 1 or 2 cps) so that it can penetrate to a pre-determined depth in a friable sandstone substrate to consolidate the substrate with the concentration of the silicate being sufficient to be gelled by the gelling agent after achievement of the penetration into the substrate.

7 Claims, 1 Drawing Figure

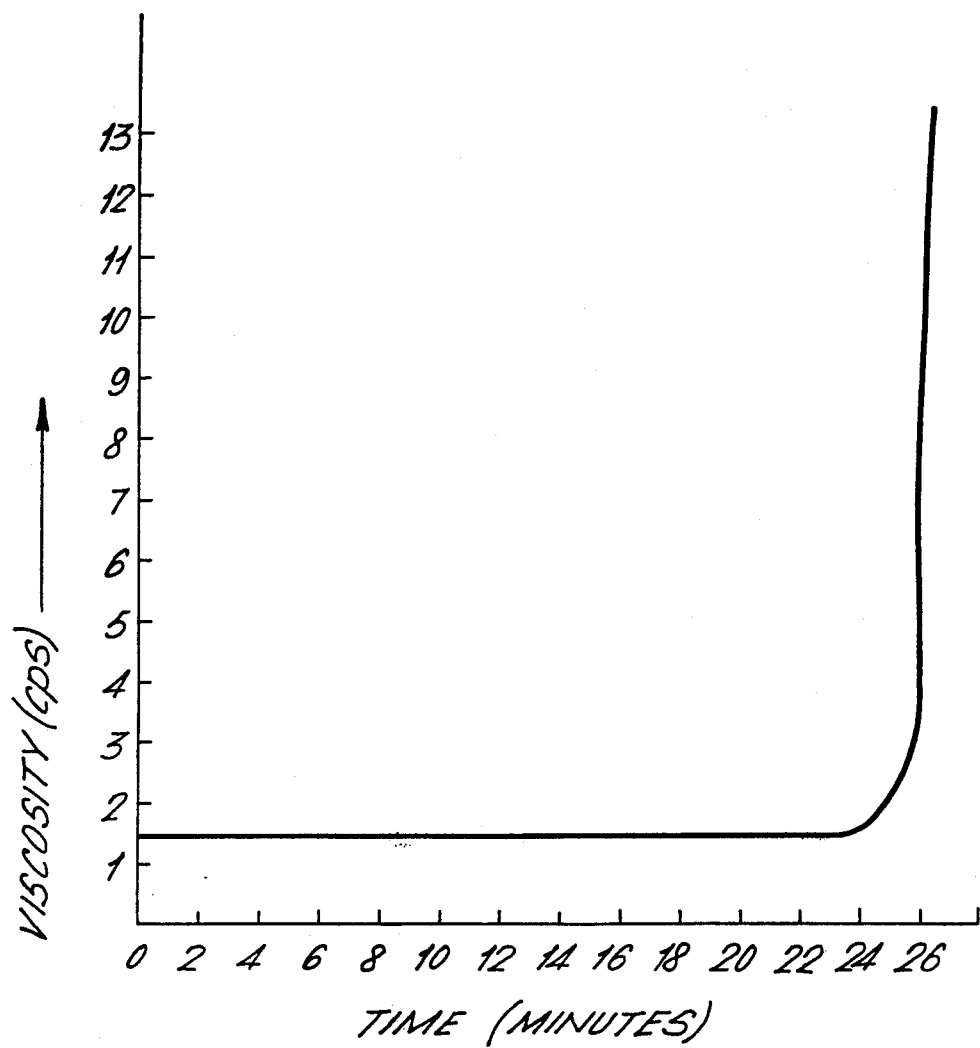

SOIL CONSOLIDATION METHOD

This application is a continuation-in-part application of application Ser. No. 415,472 dated Nov. 13, 1973, now abandoned.

This invention relates to the consolidation of a friable substrate.

In my copending application Ser. No. 335,971 dated Feb. 26, 1973, now issued as U.S. Pat. No. 3,865,600 there is described and claimed a method of consolidating soil to create water-impermeable underground barriers, said method comprising applying to the soil an aqueous solution consisting essentially of an alkali metal silicate and a gelling agent therefor, the gelling agent having a saponification value of 503 to 580 mg KOH/g and being a tripartite blend of the mono-, di-, and tri-acetate acid esters of glycerol, the monoester being in a substantial amount to impart water miscibility to the other two esters, the di-acid ester and the tri-acid ester being present to hydrolyse in the presence of the silicate, and release an acid component which gels a substantial part of the silicate to form in the soil within a reasonably short period of time, a water-impervious gel. All of the disclosure of this patent is incorporated herein merely by this reference.

While such a method, and the composition therefor, work satisfactorily it will be appreciated by those skilled in the art that soils differ from site to site and therefore have different characteristics. One type of soil in which it is extremely difficult to form structures such as tunnels, ducts, underground stores, is friable sandstone of the type having a void content of the order of from about 18% to about 30%. Such sandstone occurs in the United States and has been characterised by Thiel in Sedimentary and Petrographic Analysis of the St. Peter Sandstone *Bull. Geog. Soc. Amer.* (1935) 46, 559-614. The St. Peter Sandstone formation varies in thickness from a thin layer of sand grains in Eastern Wisconsin to 500 ft. at Joliet, Illinois. It is exceedingly variable in thickness and may show a range of 1 foot to 100 foot within a horizontal distance of ¼ mile. Further information may be had from a M. Sc. Thesis, University of Minneapolis, by C.M. Payne "Engineering aspects of the St. Peter Sandstone in the Minneapolis-St. Paul area of Minnesota, 1967."

Working in St. Peter Sandstone is extremely difficult, especially when drilling tunnels. One technique is to mechanically hammer the forward face of the tunnel using a hammer at about 45 psi air pressure. The loosened sandstone is then shovelled into wheelbarrows and brought to the surface where it is tipped. Progress is slow, and the walls and roof of the tunnel must be lagged or shored up using wooden boards. Roof falls are especially common and these hamper progress. It is also especially important to control the water content of the sandstone face, since if too much water is present the sandstone face tends to collapse into wet loose sand which makes tunnelling very difficult.

It is an object of this invention chemically to consolidate such friable soil to the extent that the need for shoring or lagging of the tunnel is reduced.

It is an object of this invention chemically to consolidate such friable soil by means of an aqueous composition the viscosity of which is so low that the composition can penetrate the sandstone without causing it to collapse.

These and other objects of the invention are apparent from the following description.

A gel forming composition consisting essentially of an aqueous solution of an alkali metal silicate and a gelling agent therefor, the alkali metal silicate having a silica to alkali metal oxide weight ratio of from 2.3:1 to 3.4:1, and the gelling agent consisting of a tripartite blend of the mono-, di-, and tri-acetate acid esters of glycerol having a saponification value of about 590-670 mg KOH/g, such that the composition has viscosity of about 1 or 2 cps for at least about 20 minutes whereafter the gelling agent gels the alkali-metal silicate to form a water-impervious soil-consolidating gel.

A method of using a composition to consolidate a friable soil comprising providing a composition consisting essentially of an aqueous solution of an alkali metal silicate and a gelling agent therefor, the alkali metal silicate having a silica to alkali metal oxide weight ratio of from 2.3:1 to 3.4:1, the gelling agent consisting of a tripartite blend of the mono-, di-, and tri-acetate acid esters of glycerol having a saponification value of about 590-670 mg KOH/g, and the composition having a viscosity of about 1 or 2 cps, applying said composition to the soil and allowing or causing the composition to percolate into said soil for at least about 20 minutes wherein the composition remains at low viscosity while percolating into the soil, and wherein the composition then gels.

The rate of the reaction between the gelling agent and the alkali metal silicate will depend on many factors including the quantity of the two reactants, the silica: alkali metal oxide ratio of the alkali metal silicate, the saponification value and hence composition of the gelling agent, and the temperature at which the reaction takes place.

The alkali metal silicate may be sodium silicate, potassium silicate or lithium silicate but it is preferred to use an aqueous solution of sodium silicate on the grounds of cost and convenience, and the water resistance of the formed gel. Numerous aqueous solutions of sodium silicates of the required silica: sodium oxide ratio and viscosity are commercially available, sodium silicates having a silica: sodium oxide ratio of 3.0 : 1 to 3.3 : 1 are preferred. For a given solids content and at a particular temperature the viscosity of an aqueous sodium silicate solution increases as the silica to soda ratio increases.

If the viscosity of a particular sodium silicate solution is too high water may be added to achieve the required viscosity of about 1 to 2 cps. The viscosity of the sodium silicate solution will also vary with temperature so that when working at low temperatures of the order of 5°-10° C it may be necessary to incorporate additional water to reduce the viscosity to the required value.

The acetic acid esters of glycerol are prepared commercially by reacting glycerol with an acetylating agent, conveniently ketene, acetic anhydride or acetic acid, and depending on the reaction conditions, e.g. temperature and time, a ternary system of the monester (so-called "monoacetin"), the diester (so-called "diecetin") and the triester (so-called "triacetin") is formed. Commercially available diacetin contains a proportion of the monoester and this may vary according to the source of supply from as low as 10% to as high as 60% by weight. Nevertheless, for commercial use, such blends are identified under the name diacetin and the ester content may be expressed as a saponification value in terms of only one constituent present, namely diacetin. Standards for such a determination are given in, for example, British standard 1594 : 1950. The saponification value, expressed as mg KOH/g increases as the triacetin content of a tripartite mixture of monoacetin, diacetin and triacetin increases. When such mixtures are used as gelling agents for sodium silicate the rate of reaction between the gelling agent and the sodium silicate is slower the higher the triacetin content of the gelling agent due it is believed to the lower solubility of a high triacetin content ester mixture in the sodium silicate. When used as a gelling agent in the process of the invention, in order to allow sufficient time for the gel-forming composition to penetrate into the soil it is important to delay the commencement of the reaction between the ester mixture and the sodium silicate, and this delay is achieved by using an ester mixture having a saponification value of about 590–670 mg KOH/g. If the saponification value is higher than about 670mg KOH/g commencement of the reaction may be delayed for too long which not only makes the consolidation process inconvenient but also introduces the danger of the soil collapsing or falling as a result of being wetted by the ungelled composition. Ester mixtures having a saponification value of 590-655 mg KOH/g are preferred. When working at low temperatures of the order of 5°-10° C ester mixtures having a saponification value at the lower end of the range, i.e. 590 – 620, are desirable since these mixtures contain a lower proportion of triacetin and are therefore more reactive.

The quantity of gelling agent used will vary depending on its composition and on the composition of the sodium silicate solution which it is required to gel. The amount will normally range from 0.05 to 0.20 parts by volume per part of undiluted sodium silicate solution.

The gel-forming composition may be applied to the soil by injection or spraying, with or without pressure.

The invention is illustrated by the following examples.

EXAMPLE I

In a laboratory a sodium silicate solution having a silica:sodium oxide ratio of 3.0 : 1, a solids content of 38 – 40% by weight, and a viscosity at 20° C of 150 cps was diluted with water until the viscosity of the solution was reduced to 1 to 2 cps. To the solution was added a commercially available blend of commercial diacetin and triacetin (50:50 by weight) having a saponification value of 650 mg KOH/g, in a ratio of 0.09 parts by volume per part of the viscous sodium silicate solution. The formed solution was clear and colorless and it was left at 24° C for about 30 minutes. The viscosity was measured at two minute intervals and plotted against time. The results are shown diagrammatically on the accompanying graph of the FIGURE from which it can be seen that the viscosity remained constant for about 24 minutes and then suddenly rose sharply when the solution gelled.

EXAMPLE 2

The method of Example I was repeated using as the gelling agent a 70:30 by weight blend of commercial diacetin and triacetin having a saponification value of 605 mg KOH/g. The gelling agent was used in a ratio of 0.1 part by volume per part of the sodium silicate solution. A similar curve to that of the drawing was obtained.

EXAMPLE 3

A freshly made up batch of 30 litres of the composition of Example I was sprayed using a hand spray gun on to the wall of a tunnel drilled in St. Peter sandstone, Minneapolis, Minnesota, having a void content of approximately 25%. The composition penetrated about 10–15 cm, and within half an hour or so the friable sandstone face became a self-supporting non-friable structure. Cores about 10 cm deep were removed 48 hours later and were found to have a compressive strength of the order of 2000 to 3000 lb/sq. inch.

EXAMPLE 4

The method of Example 3 was repeated save that the composition was injected via a hole drilled into the sandstone, and similar results were obtained.

EXAMPLE 5

One part by volume of a sodium silicate solution having a silica : sodium oxide ratio of 3.22 : 1 and a solids content of 37.6% by weight was diluted with 1.25 parts by volume of water. The gelling agent of Example 2 was then added in a ratio of 0.1 parts by volume per part of undiluted sodium silicate solution. The formed solution was allowed to stand at 14° C and the viscosity of the solution was measured over a period of 25 minutes. The viscosity remained constant initially and then rose rapidly after 21 minutes.

EXAMPLE 6

The gelling agent of Example 1 was added at the rate of 0.1 parts by volume per part of undiluted sodium silicate solution to a mixture of 2 parts by volume of a sodium silicate solution having a silica:sodium oxide ratio of 2.4 : 1 and a solids content of 47% by weight, and 1 part by volume of water. The formed solution was allowed to stand at 27° C. Gel formation took place after approximately 30 minutes.

Without further elaboration, the foregoing will so fully illustrate my invention that others may, by applying current or future knowledge, readily adopt the same for use under various conditions of service.

I claim:

1. A method of using a composition to consolidate a friable St. Peter Sandstone soil comprising providing a composition consisting essentially of an aqueous solution of an alkali metal silicate and a gelling agent therefor, the alkali metal silicate having a silica to alkali metal oxide weight ratio of from 2.3 :1 to 3.4:1, the gelling agent consisting of a tripartite blend of the mono-, di-, and tri-acetate acid esters of glycerol having a saponification value of about 590 – 670 mg KOH/g, and the composition having a viscosity of about 1 or 2 cps, applying said composition to percolate into said soil for at least about 20 minutes, wherein the composition remains at low viscosity while percolating into the soil, and wherein the composition then gels.

2. A method according to claim 1, in which the gelling agent has a saponification value of 590 – 655 mg KOH/g.

3. A method according to claim 2, in which the alkali metal silicate is sodium silicate.

4. A method according to claim 3, in which the sodium silicate has a silica to sodium oxide weight ratio of from 3.0 : 1 to 3.3 : 1.

5. A method according to claim 1, in which the gelling agent is used in a ratio of 0.05 to 0.20 parts by volume per part of alkali metal silicate solution 6. A method according to claim 1, in which the composition is applied by injection.

7. A method according to claim 1, in which the composition is applied by spraying.

* * * * *